United States Patent [19]
Schafstall et al.

[11] 3,779,865
[45] Dec. 18, 1973

[54] FEED-THROUGH CONNECTION FOR A PRESSURE VESSEL, ESPECIALLY A NUCLEAR-REACTOR SHELL

[75] Inventors: Heinrich Günter Schafstall; Wolfgang Otto August Fürste, both of Essen, Germany

[73] Assignee: Fried Krupp Gesellschaft mit beschrankter Haftung, Essen, Germany

[22] Filed: Oct. 12, 1970

[21] Appl. No.: 79,909

[52] U.S. Cl. .................................... 176/38, 176/87
[51] Int. Cl. .............................................. G21c 9/00
[58] Field of Search ................. 176/38, 87; 285/19, 285/20, 1

[56] References Cited
UNITED STATES PATENTS

| | | | |
|---|---|---|---|
| 1,271,135 | 7/1918 | Coltrin | 285/19 X |
| 2,627,580 | 2/1953 | Picard | 285/19 X |
| 3,488,067 | 1/1970 | Sommer | 176/87 X |
| 3,355,357 | 11/1967 | Sage | 176/87 X |
| 3,353,848 | 11/1967 | Bleasby | 285/19 |
| 2,930,633 | 3/1960 | Ethington et al. | 285/1 |

FOREIGN PATENTS OR APPLICATIONS

| | | | |
|---|---|---|---|
| 873,794 | 7/1961 | Great Britain | 176/87 |
| 602,737 | 6/1948 | Great Britain | 285/19 |

*Primary Examiner*—Carl D. Quarforth
*Assistant Examiner*—E. E. Lehmann
*Attorney*—Karl F. Ross

[57] ABSTRACT

The concrete shell of a nuclear reactor, through which conduits extend, is formed with a feed-through connector anchored in the wall of the structure and traversing same. The connector includes a self-blocking safety snap-action conduit coupling surrounded by a containment including a metallic duct, a pressure reducing packing received in the duct around the conduit, and means for evacuating the annular space about the latter to eliminate leakage fluids.

5 Claims, 3 Drawing Figures

FEED-THROUGH CONNECTION FOR A PRESSURE VESSEL, ESPECIALLY A NUCLEAR-REACTOR SHELL

FIELD OF THE INVENTION

Our present invention relates to feed-through conduits and, more particularly, to a feed-through assembly for conduits traversing the wall of a concrete shell or housing and particularly the concrete wall, shell or housing of a nuclear reactor.

BACKGROUND OF THE INVENTION

To protect the environment from the dangers of nuclear-reactor cores, it has been the practice heretofore to provide a housing, shell or like structure of concrete having massive walls which may be lined internally with a steel or other metallic lining to form a pressure-retentive vessel. The latter may be effective at all times in nuclear reactors operating at elevated pressures, or may be merely a safety housing surrounding the nuclear-reactor core so as to be subjected to stress only in the event of a dangerous condition in the nuclear reactor. For substantially all nuclear reactors, e.g., water reactors of the boiling-water or pressurized type, it is necessary to provide conduits which traverse the walls of the outer structures and extend to the nuclear-reactor core. These conduits may carry fluids to be subjected to nuclear activation, may carry cooling liquids and other materials serving a heat-transfer purpose, or may supply liquids, gases or other flowable substances to the nuclear reactor core or may carry such substances out of the latter. Frequently, the substances are radioactive and constitute a source of substantial contamination. A typical use of such conduits is in the transmission of heat-exchange fluids to and from emergency cooling devices for preventing thermal breakdown (melting) of a nuclear-reactor core and a circulating means for the conventional cooling arrangements associated therewith.

The conduits traversing the concrete-structure walls of a nuclear reactor, must be provided with complex arrangements to prevent the leakage of fluids from the interior of the walls to the exterior, i.e., isolating closures. The problem will be seen to be highly complex, when it is recognized that the pressures within the enclosure may be relatively high while the thermal coefficient of expansion of the conduit and the concrete wall will generally not coincide. Complex arrangements have been proposed to reduce the effect of these disadvantages and, for the most part, the means for introducing conduits through the walls of a concrete envelope or other structure surrounding a nuclear reactor core have been excessively expensive and complex, and relatively inefficient. It should be observed that the use of transition materials between the wall and the conduit does not suffice to prevent leakage of fluids enclosed by the concrete shell, since the mechanical stresses applied to the wall and the conduit may generate a differential which, like a thermal differential, may produce cracks, fissures, crevices or the like in the substantially more brittle concrete wall.

The most common solution for the problem has, therefore, been the use of a further enclosure around the concrete vessel, e.g., in the form of a so-called containment. In nuclear-reactor technology, this containment is defined as a vessel, housing or other structure for preventing the escape to the atmosphere of fission products formed during reactor operation. Fission products may be held within nuclear-fuel elements in a primary containment and a secondary containment may be formed by the environment in which the nuclear fuel is provided. In many reactors, however, it has been the practice to provide a tertiary or final containment in the form of a sealed steel shell, commonly referred to as a containment building. While containment buildings offer considerable assurance against endangering the environment with leakage from the nuclear reactor core, their expense, and the need for emergency cooling devices for the space between the reactor and the containment building, makes their use prohibitive in most nuclear-reactor applications.

OBJECTS OF THE INVENTION

It is, therefore, the principal object of the present invention to provide a nuclear-reactor structure and, particularly, a concrete shell for a nuclear-reactor core which is traversed by one or more conduits and wherein the aforementioned disadvantages are obviated.

It is another object to provide an improved method of sealing the junction between the conduit traversing a nuclear-reactor enclosure, especially a concrete enclosure, to prevent leakage of contaminants from the interior of the enclosure to the surrounding environment.

It is another object of our invention to provide a highly efficient seal between a conduit traversing a concrete wall and the wall structure such that the sealing system is less expensive and more efficient than earlier arrangements. SUMMARY OF THE INVENTION Our present invention is based upon our discovery that complex and expensive containment buildings of the character previously described are not required for many nuclear-reactor applications, especially when the nuclear-reactor core is enclosed in a concrete shell, housing or structure, even when this structure is traversed by conduits for the circulation of cooling fluids through the core or for any other purpose for which fluid flows through the wall of the reactor enclosure where necessary. This discovery derives from our finding that it is possible to provide local containment in the region of such conduits and thereby efficiently prevent seepage of radioactive contaminants from the interior of the enclosure to the exterior.

In accordance with the principles of the present invention, the conduit includes a self-sealing snap-type coupling between a pipe member extending into the space enclosed by the concrete-wall, vessel or enclosure and a pipe member extending therefrom, the self-sealing coupling being received within the concrete wall of the enclosure and being closely surrounded by a hermetically sealed metallic containment vessel fixed to the wall of the enclosure. The containment vessel may have an inner part permanently mounted in the wall of the enclosure and an outer member removable therefrom, and, advantageously, carrying the outer conduit member and the associated element of the self-sealing coupling.

The invention presents firstly, the advantage that localized containment of each of the self-closing coupling completely eliminate the need for expensive containment vessels around the entire structure as well as the pressure-dropping system associated therewith. Furthermore, the localized containment reduces the need for sizable emergency cooling devices for responding to the development of vast amounts of thermal energy normally generated in the containment building in the event of failure of the nuclear reactor.

According to a specific feature of this invention, the space between the conduit (and self-sealing coupling) and the localized-containment vessel is filled with a pressure-dropping medium to constitute a further obstruction to nuclear contaminants which may tend to move through the containment vessel. A compartment is provided in such material to accommodate the aforementioned coupling and along the exterior of the localized containment and of the concrete structure, we may provide a fitting or the like through which such contaminant may be evacuated prior to opening of the unit. Since the containment vessel here closely surrounds the conduit, the leakage volume is necessarily small and, where the intervening space is filled with a radiation-shielding material, this shielding may suffice to enable the self-sealing coupling to be disconnected for inspection at fairly frequent intervals without danger.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
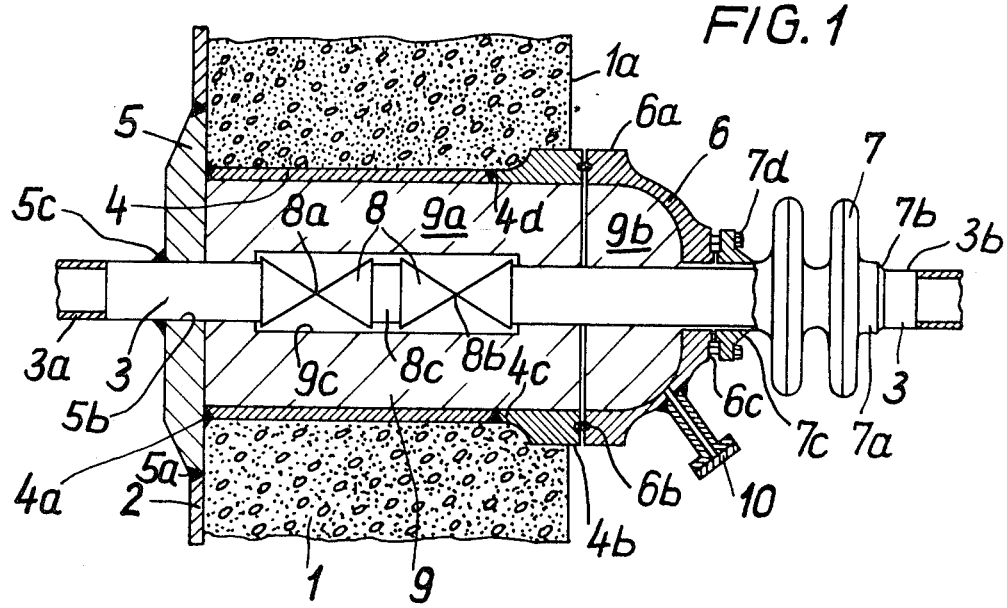
FIG. 1 is an axial cross-sectional view through a conduit arrangement according to one embodiment of the invention.

In FIG. 1 of the drawing we show a steel-reinforced concrete vessel 1 adapted to enclose a nuclear reactor, the interior of the vessel being the left side of the concrete wall 1 while the exterior is the right side of this wall.

Along the interior of the vessel there is provided a fully sealed liner of steel as represented at 2. At spaced locations the wall 1 is traversed by conduits 3 which serve to deliver fluid to or remove fluid from the nuclear reactor core and hence must extend into the space enclosed by the concrete wall 1.

In the embodiment illustrated in the drawing the conduit 3 is shown to have two major portions 3a and 3b which are axially aligned and are provided along their contiguous ends with the members of a self-sealing coupling represented at 8. Best results are provided when two such couplings 8a and 8b are employed. Each of the couplings may be of the self-sealing type shown and described at pages 73-76 of FLUID POWER, U. S. Government Printing Office, Washington, D. C. 1966.

Each member, of such a coupling includes a spring-loaded check valve so that two-way flow of fluid is normally permitted through the coupling. The interruption of continuity of the conduit however results in an automatic blockage of the respective end of the pipe section. Hence, leakage from either the pipe extending into the nuclear-reactor vessel or from the pipe extending outwardly therefrom is precluded. When two such selfsealing couplings are provided, an intermediate member 8c carries parts of a pair of such couplings.

The male and female members are locked together by snap-action means in the preferred case although screw or union couplings may also be employed.

According to the present invention, the self-sealing coupling means 8 between the two pipe sections is closely surrounded by a containment 4-7, 10, 11, 12 and 13 so that only a small volume of space is enclosed thereby.

The containment is constituted by a steel tube 4 of cylindrical configuration buttwelded at its inner end 4a to a circular plate 5 of frustoconical configuration, this plate being welded at its narrow edge 5a to form part of the steel liner 2. The plate 5 is formed with a throughgoing opening 5b closely surrounding the pipe section 3a which is secured thereto by a fillet weld 5c.

At its outer end, the containment comprises a flange region 4b having an enlarged outer portion projection beyond the outer face 1a of the concrete wall and a narrow inner portion 4c which is buttwelded at 4d to the cylinder 4 with which it is made integral.

The flange region 4b and the plate 5 constitute an anchorage in the form of a pair of enlargements which retain the cylinder 4 firmly in place within the wall.

The containment also includes a hood 6, having a flange or beat 6a confronting the flange 4b and connected therewith by bolts traversing the flanges or by other clamping means not further illustrated. An O-ring seal 6b may be introduced between the faces of the flanges 4b and 6a to further prevent leakage. The hood 6 is, of course, readily removable to permit inspection of the self-sealing couplings 8 of the pipe section 3b via a compensating member 7 in the form of a pair of steel bellows. One sleeve portion 7a of the bellows is fillet-welded or lap-welded to the pipe section 3b at 7b while the other is formed with a flange 7c confronting a face 6c of the hood and bolted thereto at 7d. Hence the temperature compensating member 7 constitutes a seal at the right-hand side of the containment and permits thermal expansion and contraction of the pipe members with a minimum of stress upon the containment. This seal is, however, permanently or temporarily affixed in a sealing manner to the hood 6 so as to be removable therewith.

Within the localized containment 4 - 7 and 10 represented in FIG. 1, we provide a mass of radioactive shielding material generally represented at 9 and preferably subdivided into two bodies 9a and 9b, respectively received in the tube 4 and in the hood 6. The mass 9, which may be formed with a chamber 9c accommodating the quick-self-sealing couplings 8, may be of any conventional shielding material, e.g., concrete, graphite or lead and not only serves to permit the hood to be removed and the fittings 8 to be inspected without substantial danger to personnel, but also acts as a throttle for contaminants leaking through the tube 4 from the interior of the vessel 1 or from the connectors 8. The hood 6 is provided with a fitting 10, preferably leading outwardly and downwardly, from which leakage substances can be drained, preferably by connecting the local containment 4 - 7 and 10 to a suction pump via this fitting. Disassembly of the device is of course permitted by removal of the hood 6 whereupon the self-sealing couplings 8 separate.

Figure 2:
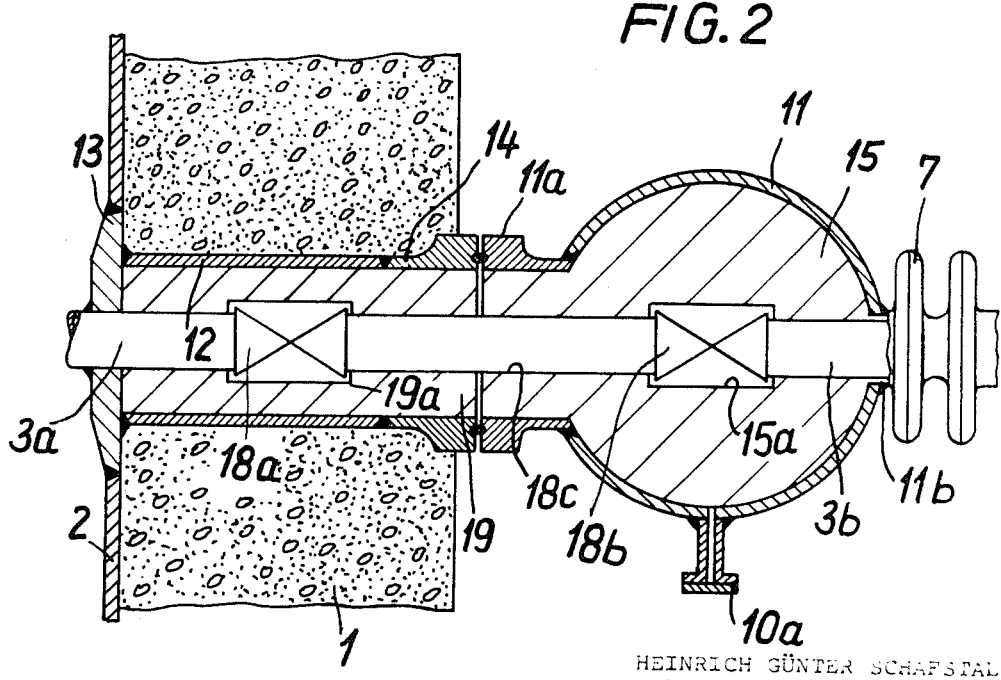
FIG. 2 is a similar view of a second embodiment of the invention.

In FIG. 2, we have shown a modified system wherein the pipe section 3a is welded to a ring 13 constituting a plate functionally similar to plate 5 and serving to seal the lining 2 in the region of the local containment. The plates 5 and 13 have diameters exceeding the diameters of the tube 12 and thus lie along the inner face of the wall of vessel 1. The mass 9 within the local containment, or 19 in the case of FIG. 2, customarily is rendered effective as a throttling means only when contaminants from the interior of the vessel penetrate the lining 2, 13.

In this embodiment, the tube 12 of steel is buttwelded to the plate 13 and to a ring 14 as previously described. However, the hood of the embodiment of FIG. 1 is here replaced by a globe 11 of generally spherical configuration which is welded to a flange 11a removably engaging the flange region 14 as previously described. At its opposite axial end, the globe 11 is welded at 11b to the temperature-compensating bellows 7 and is traversed by the tube sections 3b to which the bellows is secured as previously described. In this embodiment, however, the two self-sealing couplings 18a and 18b are axially spaced by a length 18c of conduit which may be removably received in either the head 11, 7, 11a, or the tube 12. Respective chambers 19a and 15a are provided in the shielding material 19 and 15 respectively filling members 12 and 11 to accommodate self-sealing couplings 18a and 18b. At the bottom, the globe 11 is formed with a fitting 10a from which leakage may be evacuated.

Figure 3:
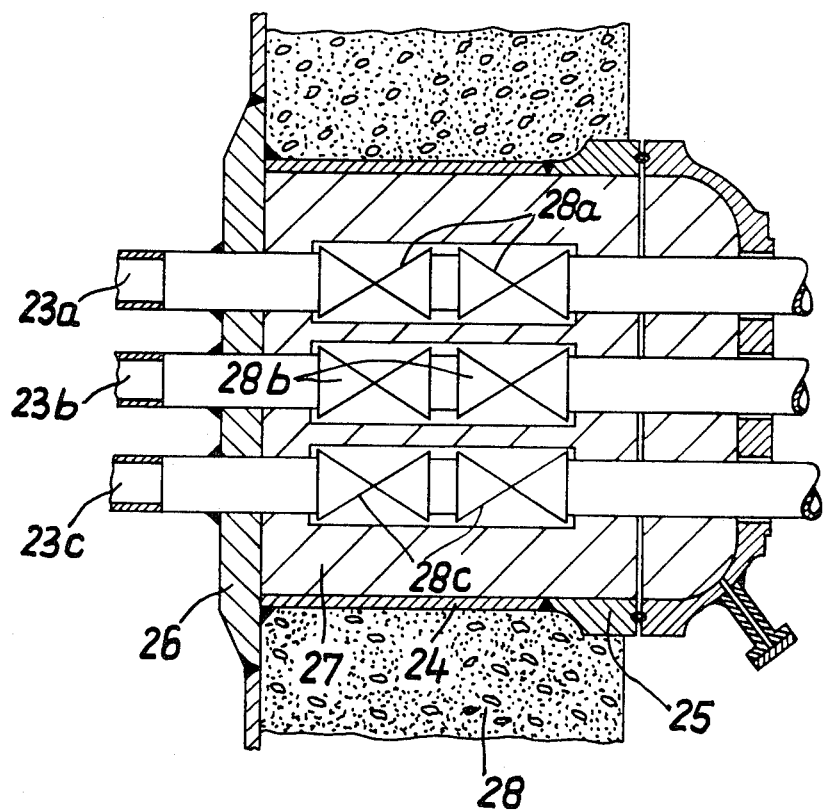
FIG. 3 is a view of a third embodiment of the invention.

In FIG. 3, we have shown a modification of the present invention wherein the tube 24 is part of the local containment for three conduits 23a, 23b and 23c which are provided with double self-closing couplings as represented at 28a, 28b and 28c and having the configuration illustrated in FIG. 1. The hood, which has the configuration illustrated in FIG. 1, carries three pipes with respective temperature-compensating bellows and is mounted on the flange 25 as previously described. The tube 24 is welded to the plate 26 forming part of the lining 27 of the concrete wall 28.

The system illustrated in FIGS. 1 – 3 represents a vast improvement in reactor safety technology since it eliminates the need for a number of other safety devices or precautions. Especially in high pressure or boiling water reactors, the principal danger has been a rupture of the vessel with release of water or steam into the containment structure. In the present case, any rupture of the lining 2 etc. is a minor problem which can readily be contained by the assembly 4, 12 etc. Furthermore, the emergency cooling system for thermal energy generated beyond the lining can be reduced. These advantages are based primarily on the reduced volume available around the conduits for traversal by dangerous substances.

The improvement described and illustrated is believed to admit of many modifications within the ability of persons skilled in the art, all such modifications being considered within the spirit and scope of the invention except as limited by appended claims.

I claim:
1. A nuclear-reactor structure comprising a nuclear-reactor core enclosed in a sealed steel liner; a reinforced-concrete vessel surrounding said linear and provided with a passage in a reinforced-concrete wall thereof; a local-containment sheath received in said passage; at least one conduit communicating with the interior of said liner and traversing said wall within said sheath while being reveived with clearance therein and provided with said sheath within a self-sealing coupling preventing leakage through at least a portion of said conduit; and a radiaion-shielding medium surrounding said conduit and said self-sealing coupling and substantially filling said sheath.

2. The nuclear-reactor structure defined in claim 1 wherein said sheath is a steel tube of cylindrical configuration welded at an interior end to said liner and having an exterior end terminating along an external face of said wall, and a hood flanged to said tube at said external end and of generally bell-shaped configuration surrounding said conduit, said hood being filled with said medium.

3. The nuclear-reactor structure defined in claim 2, further comprising an expansion bellows connected to said hood and secured to said conduit.

4. The nuclear-reactor structure defined in claim 2 wherein said conduit is provided with two such safety closures therealong.

5. The nuclear-reactor structure defined in claim 2, further comprising at least one other such conduit traversing said sheath and surrounded by said medium while being provided with at least one such self-sealing coupling.

* * * * *

PO-1050
(5/69)

UNITED STATES PATENT OFFICE
CERTIFICATE OF CORRECTION

Patent No. 3,779,865      Dated 18 December 1973

Inventor(s) Heinrich Günter SCHAFSTALL et al

It is certified that error appears in the above-identified patent and that said Letters Patent are hereby corrected as shown below:

In the heading, after line [21] insert:

-- [30] Foreign Application Priority Data

15 October 1969    Germany    P 19 51 856.0 --

Signed and sealed this 30th day of April 1974.

(SEAL)
Attest:

EDWARD M.FLETCHER,JR.            C. MARSHALL DANN
Attesting Officer                 Commissioner of Patents